(12) United States Patent
Dubuc

(10) Patent No.: US 8,668,351 B2
(45) Date of Patent: Mar. 11, 2014

(54) LED TRAFFIC SIGNAL AND OPTICAL ELEMENT THEREFOR

(75) Inventor: Eden Dubuc, St-Michel (CA)

(73) Assignee: GE Lighting Solutions, LLC, Cleveland, OH (US)

( * ) Notice: Subject to any disclaimer, the term of this patent is extended or adjusted under 35 U.S.C. 154(b) by 440 days.

(21) Appl. No.: 13/040,874

(22) Filed: Mar. 4, 2011

(65) Prior Publication Data

US 2011/0182069 A1 Jul. 28, 2011

Related U.S. Application Data

(63) Continuation-in-part of application No. PCT/US2009/056029, filed on Sep. 4, 2009.

(60) Provisional application No. 61/094,253, filed on Sep. 4, 2008.

(51) Int. Cl.
*F21V 5/04* (2006.01)

(52) U.S. Cl.
USPC .................................. 362/235; 362/249.02

(58) Field of Classification Search
USPC .............. 362/153.1, 235, 249.02, 249.14, 362/311.02, 311.06
See application file for complete search history.

(56) References Cited

U.S. PATENT DOCUMENTS

| 4,420,800 | A | 12/1983 | Van Horn |
| 5,947,587 | A | 9/1999 | Keuper et al. |
| 6,981,784 | B2 | 1/2006 | Dubuc |
| 8,469,567 | B2 * | 6/2013 | Futami .................. 362/545 |
| 2002/0034081 | A1 * | 3/2002 | Serizawa .............. 362/540 |
| 2003/0076237 | A1 | 4/2003 | Blumel |
| 2008/0130309 | A1 * | 6/2008 | Condon et al. ........ 362/520 |
| 2011/0122615 | A1 * | 5/2011 | Okada et al. ......... 362/235 |

FOREIGN PATENT DOCUMENTS

| CN | 2921562 Y | 6/2006 |
| CN | 201081109 | 7/2008 |
| CN | 201103852 | 8/2008 |
| EP | 1466807 A1 | 10/2004 |
| JP | 2002-093211 | 3/2002 |
| JP | 2002-289023 | 10/2002 |
| JP | 2005-049367 | 2/2005 |

OTHER PUBLICATIONS

International Search Report from PCT/US2009/056029.
Chinese Office Action and Search Report dated Jun. 28, 2013.

* cited by examiner

*Primary Examiner* — David V Bruce
(74) *Attorney, Agent, or Firm* — Fay Sharpe LLP

(57) ABSTRACT

A lighting device includes a housing having an open end and a geometrical axis and at least one light source disposed along an optical axis. The lighting device further includes an outer optical element having a focal point and closing the open end of the housing, the optical element comprising a converging outer surface and a diverging inner surface that cooperates with the light coming from the inner optical element. Additionally, the lighting device includes an inner optical element between the light source and the outer optical element, the inner optical element redirecting light from a light source that is offset from the focal point toward the outer optical element.

17 Claims, 12 Drawing Sheets

US 8,668,351 B2

LED TRAFFIC SIGNAL AND OPTICAL ELEMENT THEREFOR

This application is a continuation-in-part of PCT Application No. PCT/US2009/056029, filed Sep. 4, 2009, which claims the benefit of U.S. Provisional Application No. 61/094,253, filed Sep. 4, 2008.

FIELD OF THE DISCLOSURE

The present disclosure relates to lighting devices. More particularly, the present disclosure relates to an efficient signal lamp for controlling the light coming from a relatively small light source.

BACKGROUND

The current construction of signaling lamps allows for the control of light by employing multiple lenses, including a first converging lens and a second diffusing lens (see FIG. 1). For example, U.S. Pat. No. 5,947,587, which is incorporated by reference herein, discloses a signal lamp comprising a box-shaped housing 1 having an open end 2 that is closed by a spreading window 3. LEDs 4 are clustered around a central axis 6 of the housing 1 and a positive lens 7, which is described as a fresnel lens, is interposed between the spreading window and the LEDs.

LEDs 4 are disposed in an array having a surface area that is 25% of the surface area of the Fresnel lens 7. The Fresnel lens 7 acts to converge the light beam pattern and then the spreading window 3 diffuses the light. Using two optical elements, i.e., the Fresnel lens and the spreading window, results in light loss through the two optical components. Furthermore, two separate optical components are required to be manufactured and assembled into the signal lamp, adding to the manufacturing cost and efficiency of the LED signal.

Accordingly, it is desirable to develop an efficient signaling lamp that diffuses the light before converging the light so as to control the distribution of light onto the field, while using less plastic parts.

BRIEF DESCRIPTION

In one embodiment a lighting device is provided. The lighting device includes a housing with an open end, a refractive optical element closing the open end of the housing and including a converging outer surface and a diverging inner surface, and a light source cooperating with the refractive optical element. The light source is disposed proximate the focal point of the refractive optical element. The optical element may include an inner surface having a reference plan normal to the trajectory of the incoming light rays. Alternatively, the optical element may include a collimating lens, the inner surface being configured to be planar and normal to light rays emanating from the light source and the outer surface being configured to redirect light rays to provide a generally collimated light beam pattern.

In another embodiment, a lighting device is provided. The lighting device includes a housing having an open end and a geometrical axis and at least one light source disposed along an optical axis. The lighting device further includes an outer optical element having a focal point and closing the open end of the housing, the optical element comprising a converging outer surface and a diverging inner surface that cooperates with the light coming from the inner optical element. Additionally, the lighting device includes an inner optical element between the light source and the outer optical element, the inner optical element redirecting light from a light source that is offset from the focal point toward the outer optical element. The outer and inner optical elements may be rotationally symmetrical about the geometrical axis. The inner surface of the outer optical element may be facetted and the outer surface of the outer optical element may be smooth. The light source may include a first and second light source, the first light source being disposed closer to the inner optical element than the second light source. The outer optical element may be configured to cooperate with a second light source to provide a generally collimated light beam pattern.

In yet another embodiment, a lighting device is provided. The lighting device includes a housing having an open end and at least two converging lenses. One converging lens is positioned to collect most of the light from a light source and another converging lens is positioned to close the open end of the signal lamp and distribute the light for a given specification. Optionally, at least one light source is disposed along an optical axis and the housing has a geometrical axis.

In yet another embodiment, a lighting device is provided. The lighting device includes a housing having an open end, a light source, and a converging lens. The converging lens includes a curved entry face, a total internal reflection face and an exit face, wherein the curved entry face is configured to converge the light from the light source toward the center of the total internal reflection face.

DETAILED DESCRIPTION

Figure 1:
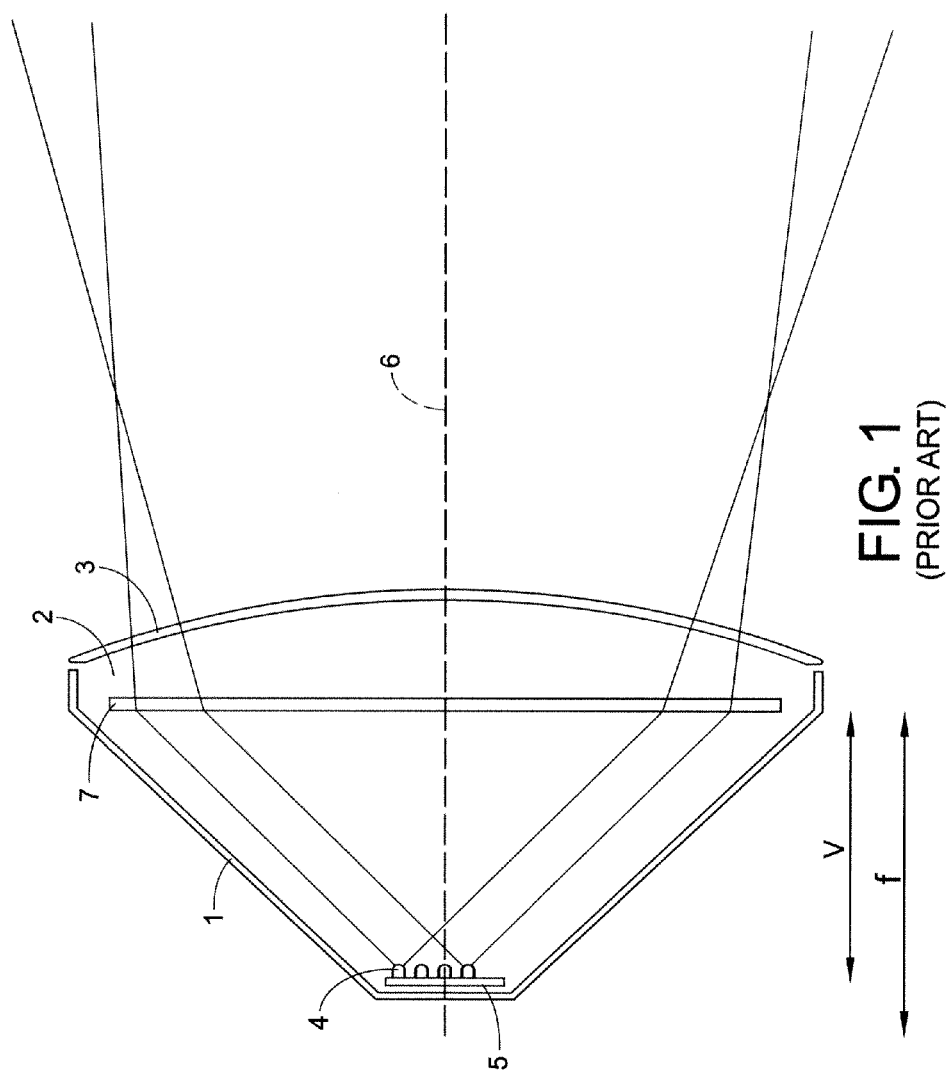
FIG. 1 is a schematic, sectional view of a prior art signal lamp.

One or more implementations of the present disclosure will now be described with reference to the attached drawings, wherein like reference numerals are used to refer to like elements throughout.

Figure 2:
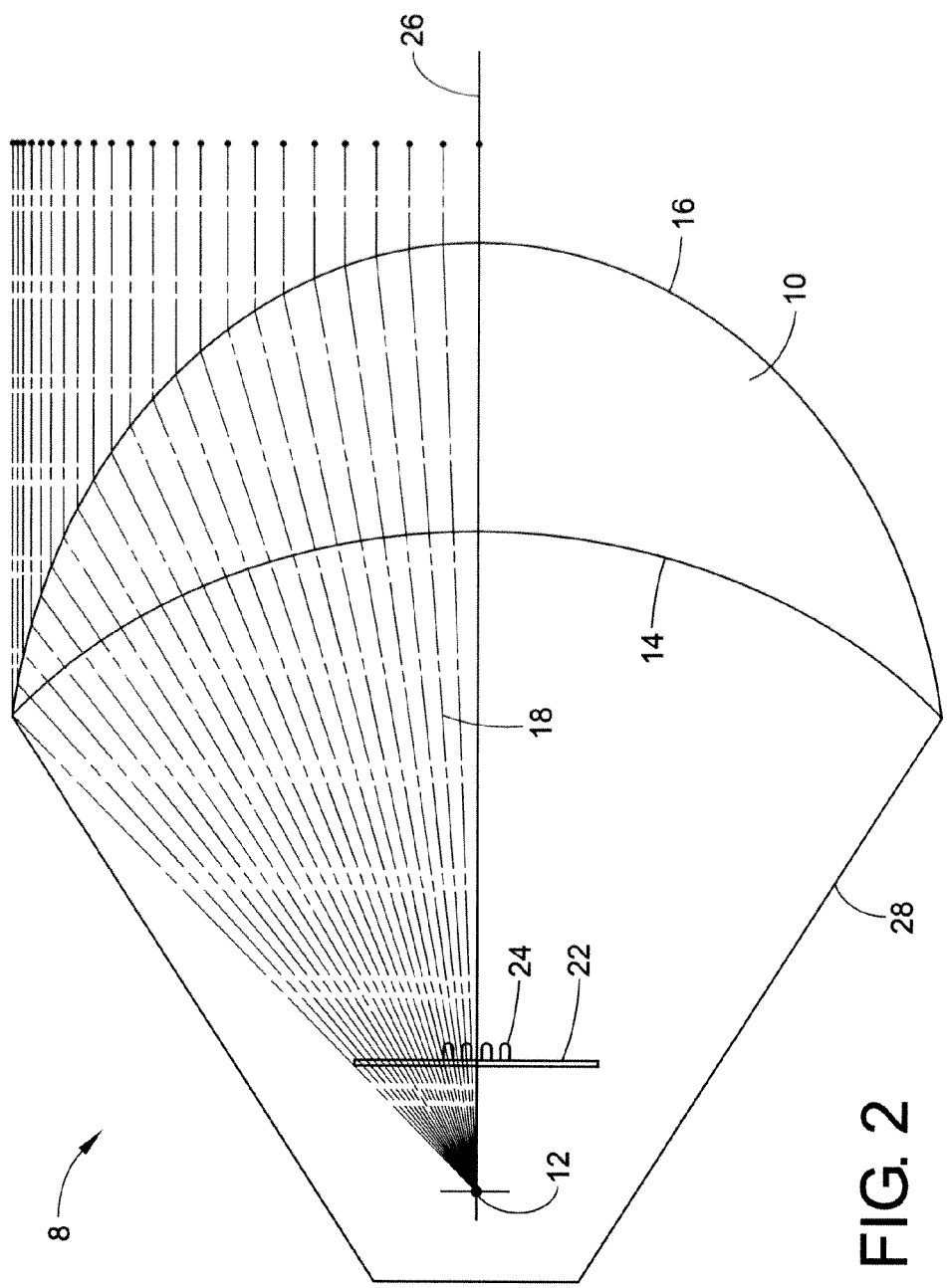
FIG. 2 is a schematic, sectional view of a signal lamp having a positive lens with a far side converging surface.

FIG. 2 discloses a signal lamp 8 including a refractive optical element 10, which is shown as being a collimating lens, cooperating with a point light source 12 at a focal point of the optical element. The collimating lens 10 includes an inner surface 14 and an outer surface 16. The inner surface 14 is shaped so that it is normal to light rays 18 emanating from the point light source 12 so that minimal or no refraction of these incoming light rays occurs at the inner surface 14. The outer surface 16 is configured to redirect light rays to provide a generally collimated (parallel or nearly parallel) light beam pattern. For example, where most of the light rays are within about 20° beam angle is considered appropriate to form a nearly collimated (nearly parallel) beam pattern.

FIG. 2 also schematically depicts a support 22 for a plurality of LEDs 24. The virtual point light source 12, as mentioned above, is disposed at the focal point for the lens 10. The support 22, which in the depicted embodiment is a printed circuit board, is offset inwardly from the focal point for the collimating lens 10 and situated perpendicular to a central axis 26. The LEDs 24 are clustered around the central axis 26 of the collimating lens 10, which can also be a central axis of a signal lamp housing 28 that includes the LEDs 24 and the collimating lens 10. The housing 28 for the signal lamp has an open end that is closed by the collimating lens 10. The LEDs 24 on the support 22 are near enough the central axis 26 and set inwardly from the focal point of the lens 10 to generate a beam pattern that is similar to the beam pattern that is generated by the virtual point light source 12.

Figure 3:
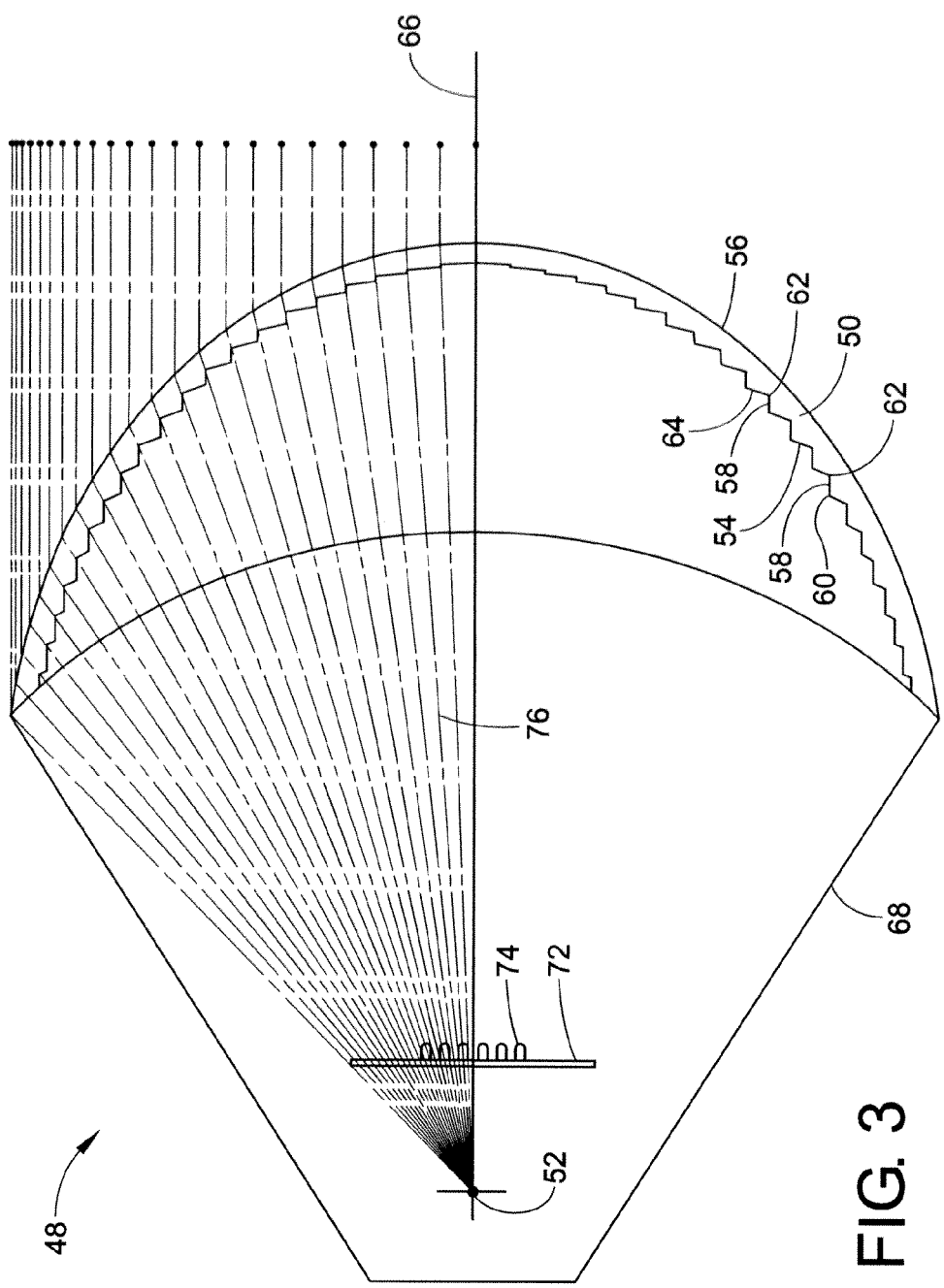
FIG. 3 is a schematic, sectional view of a second embodiment of a signal lamp having a positive lens with a faceted inner surface that is moldable.

FIG. 3 depicts an alternative embodiment of signal lamp 48. FIG. 3 depicts a refractive optical element 50 cooperating with a virtual point light source 52 that is disposed at a focal point for the optical element. The lens 50 can be rotationally symmetric about a central axis 66. If it is desired to create an asymmetric beam pattern, then an inner surface 54 of the lens 50 can be disposed in a pattern, e.g. a radial or linear (square or diamond) pattern. The optical element 50 includes the inner surface 54 and the outer surface 56. In contrast to the embodiment shown in FIG. 2, the inner surface 54 is configured similar to a fresnel lens where the inner surface is facetted. The inner surface 54 is facetted in such a manner, however, that the refractive optical element 50 can be injection molded. In doing so, the substantially horizontal portions of each facet (per the orientation shown in FIG. 3) are at least substantially parallel to the central axis 66 of the optical element 50 and the signal housing 68 or at an angle such that the optical element 50 can be ejected from a mold. For example, the horizontal portions 58 of each facet slopes away from a line parallel to the central axis 66, which coincides with the ejection direction from the mold, from an innermost edge 62 of the horizontal portion in a direction towards an outermost edge 60 of the horizontal portion.

Each facet also includes a generally vertical portion 64 to refract the light towards the outer surface 56 of the optical element 50. The outer surface 56 is configured to narrow to beam pattern. If the surface 54 is normal to light coming from the point source, the outer surface 56, similar to the outer surface 16 described above, is configured to redirect light rays to generate a generally collimated (parallel or nearly parallel) light beam pattern. For example, where most of the light rays are within about 20° beam angle is considered to be appropriate to form a nearly collimated (nearly parallel) beam pattern. Developing an asymmetric beam is described with reference to FIG. 7, below.

FIG. 3 depicts a support 72 disposed in the housing 68 and a plurality of LEDs 74 disposed on the support. The LEDs 74 and the support 72 are spaced inwardly from the virtual focal point 52 of the lens 50 similar to the embodiment shown in FIG. 2. The support 72 can be a printed circuit board and be situated substantially perpendicular to the central axis 66. The LEDs 74 are clustered around the central axis 66. Similar to U.S. Pat. No. 5,947,587, the surface area of the footprint for the LEDs 74 can be about 25% of the surface area of the refractive optical element 50.

FIG. 3 discloses light rays 76 that emanate from a virtual point light source disposed at the focal point 52 of the refractive optical element 50. By spacing the LEDs 74 and the support 72 inwardly from the focal point 52 toward the refractive optical element 50 the rays emanating from the LEDs can follow substantially the same path as the light rays 76 shown for the virtual point light source 52.

Figure 5:
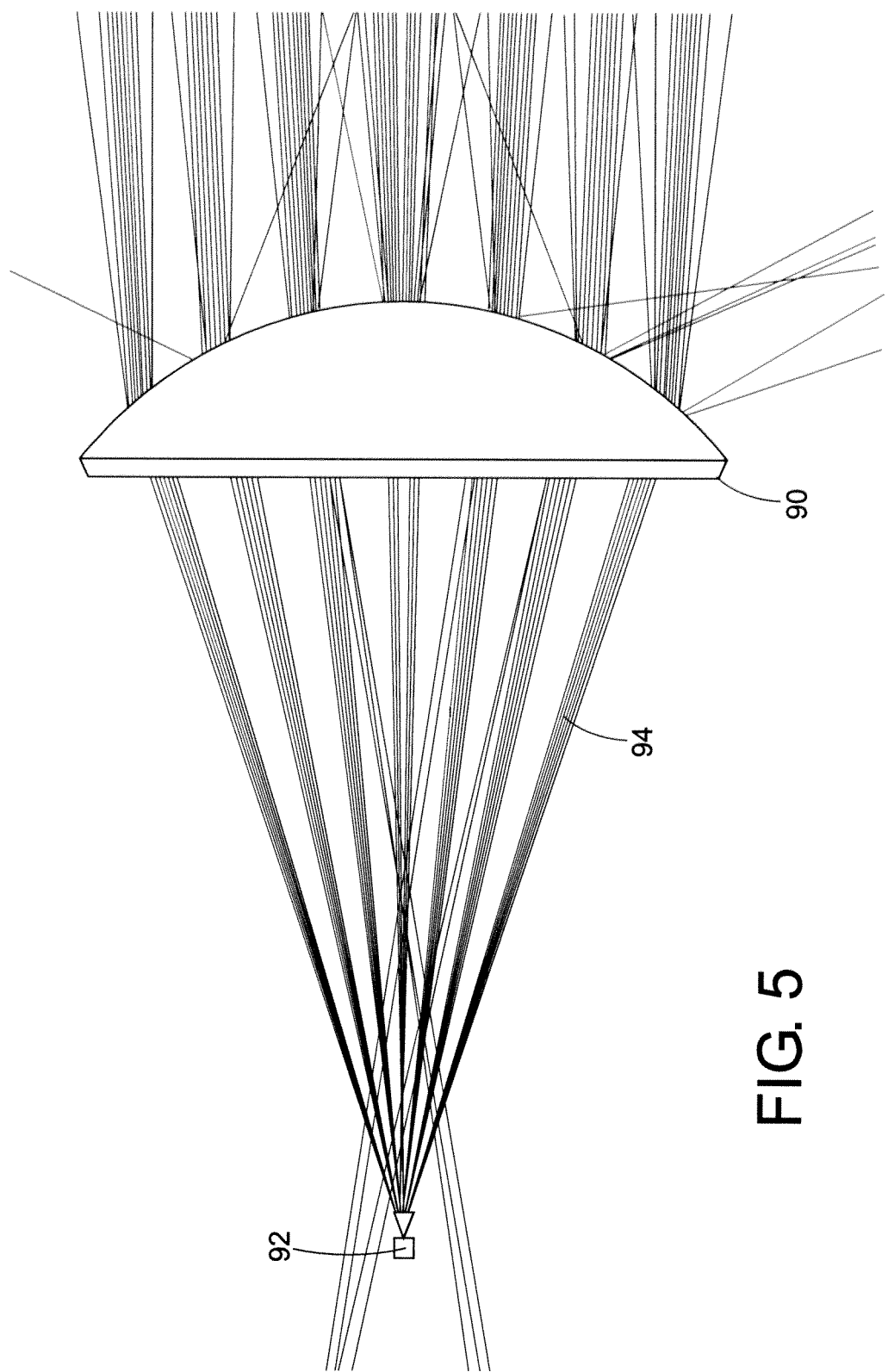
FIG. 5 is a side view of the lens shown in FIG. 3 cooperating with a light source.
Figure 6:
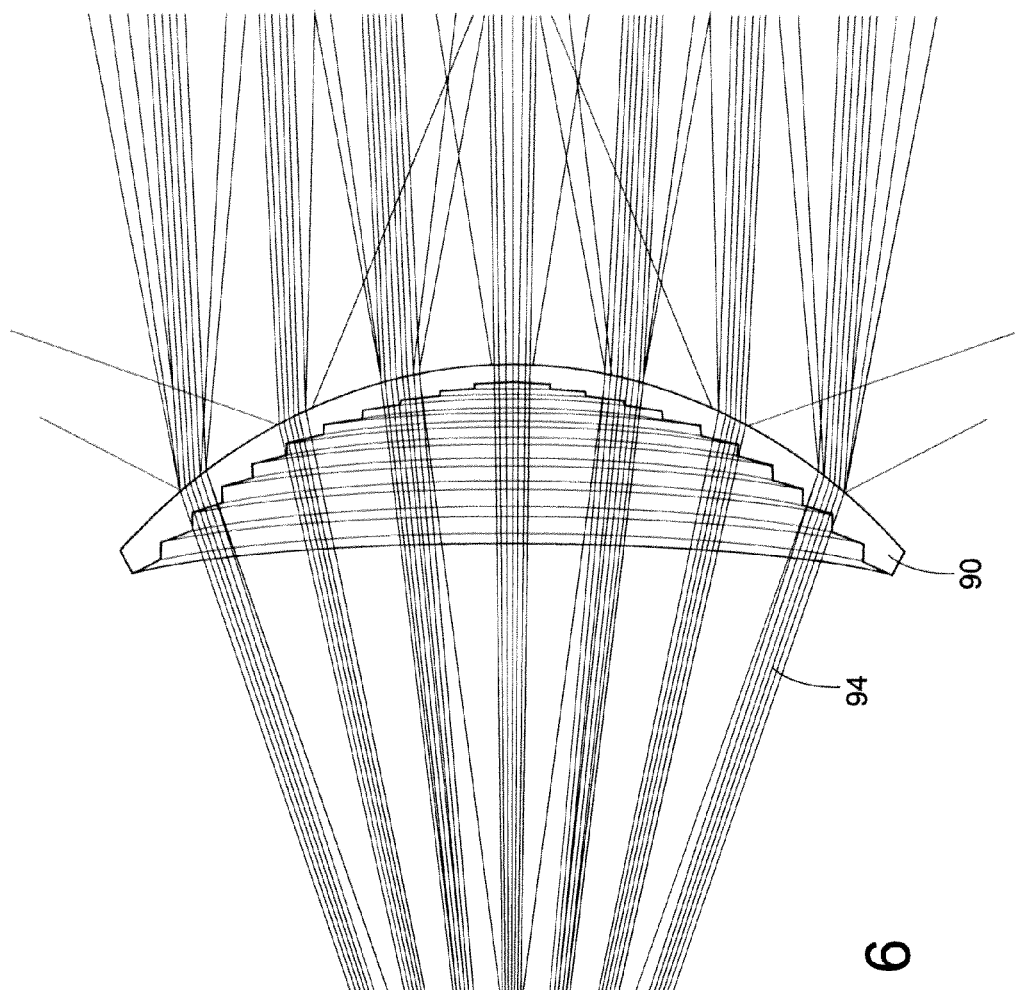
FIG. 6 is an optical simulation ray tracing screen shot of the optical element shown in FIG. 5.

FIG. 5 discloses a side view of the lens 90 shown in FIG. 3 cooperating with the single light element 92 and the light rays 94 emanating from the single light element. The single light element 92 is situated at the focal point for the lens 90, similar to the virtual point light sources described above. In a similar manner to the signal lamps disclosed above, a plurality of LEDs can be clustered around a central axis of the lens 90 offset inwardly from the virtual focal point to generate a beam pattern that closely approximates the beam pattern shown in FIG. 5. FIG. 5 more accurately depicts the substantially collimated light beam pattern in that the light rays are all not precisely parallel to one another but instead are substantially parallel to one another to generate a generally or substantially collimated light beam pattern. FIG. 6 is a close-up view of a cross section taken through FIG. 5.

Figure 4A:
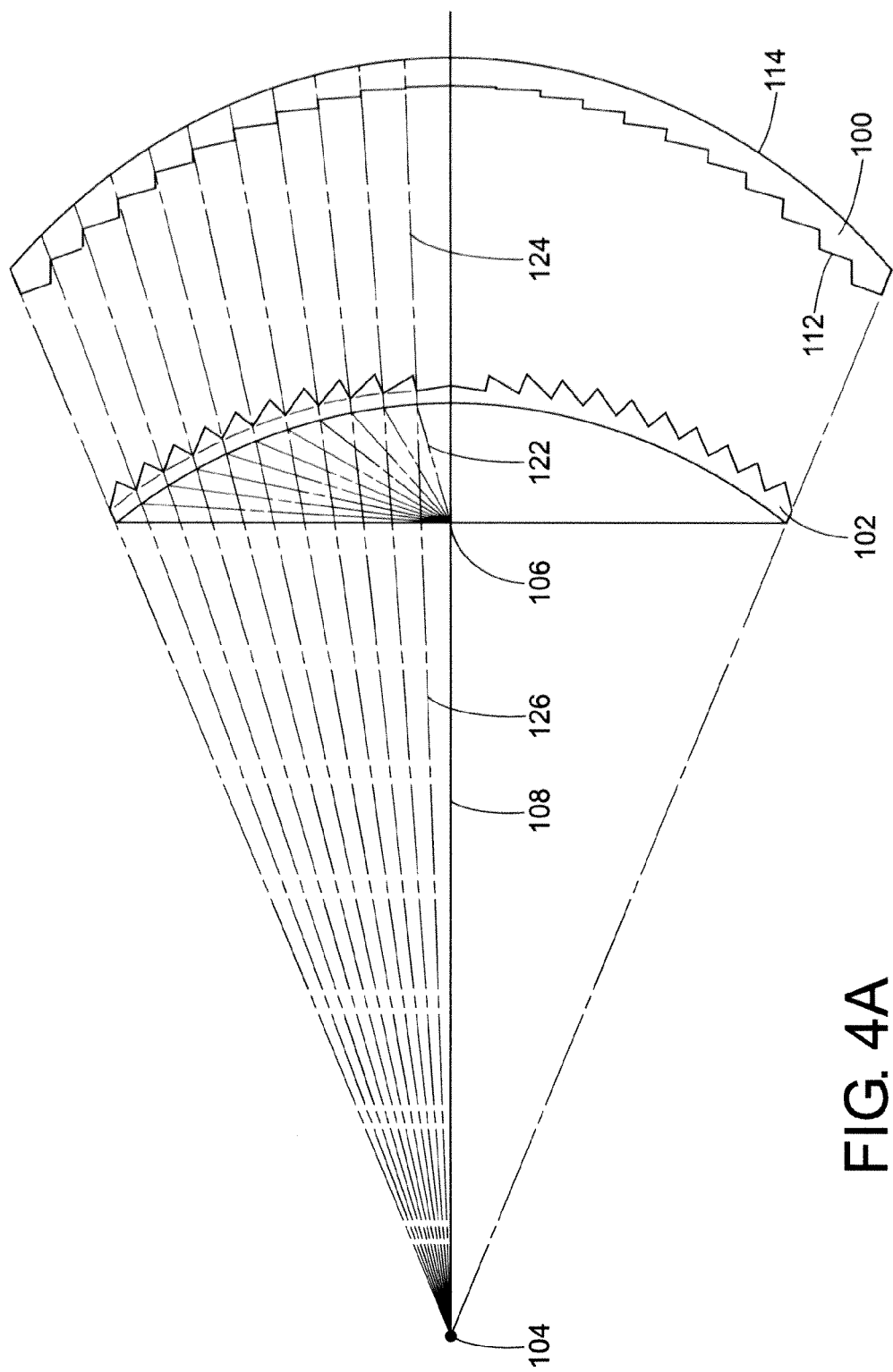
FIG. 4A is a schematic view of two optical elements cooperating with a light source for use in a third embodiment of a novel signal lamp.

FIG. 4A depicts a schematic sectional view of two refractive optical elements 100 and 102 and two virtual point light sources 104 and 106. Each point light source 104 and 106 is disposed along an axis 108 which is centered within respect to both of the optical elements 100 and 102. The optical element 102 can be rotationally symmetrical about the central axis 108. If, however, an asymmetric beam pattern is desired, the optical element 100 may not be rotationally symmetrical about the central axis 108.

The outer refractive optical element 100 includes an inner facetted surface 112 and an outer smooth surface 114. The inner facetted surface 112 is similar to the facetted surface described with reference to FIG. 3 in that it is similar to a Fresnel style but is able to be injection molded. The outer optical element 100 is configured to cooperate with the furthest virtual point light source 104 to provide a generally collimated beam pattern similar to the embodiment shown in FIGS. 2 and 3. The outer optical element 100 closes the open end of a signal lamp housing (not shown) similar to the optical elements 10 and 50 described above.

The inner optical element 102 is used to create a virtual far focal point for the optical element 100. The optical element 102 is also used to improve the efficiency of the signal lamp by collecting all, or nearly all, the light for the LED point light source. The optical element 102 reduces the thickness of the signal lamp. The optical element shown in FIG. 3 is shown as a positive lens; however, the optical element can be designed to be a refractive element, a diffractive element, an internal refraction element, and/or a reflective element.

The inner optical element 102 is configured to cooperate with a virtual point light source 106 that is closer to both the inner optical element 102 and the outer optical element 100. The inner optical element 102 is configured to redirect the incoming light rays 122 from the point light source 106 so that the exiting light rays 124 generally follow the same path as the light rays 126 emanating from the furthest virtual point light source 104. By providing the additional inner optical element 102 the depth of the housing can be reduced due to the redirection of the light rays provided by the inner optical element 102. Accordingly, LEDs can be provided inwardly (i.e. towards the optical elements 102 and 100) from the virtual point light source 106 in a similar manner to those described with reference to FIGS. 2 and 3. The optical elements 100 and 102 can be disposed inside a housing (not shown) similar to the housings 28 and 68 described above.

Figure 4B:
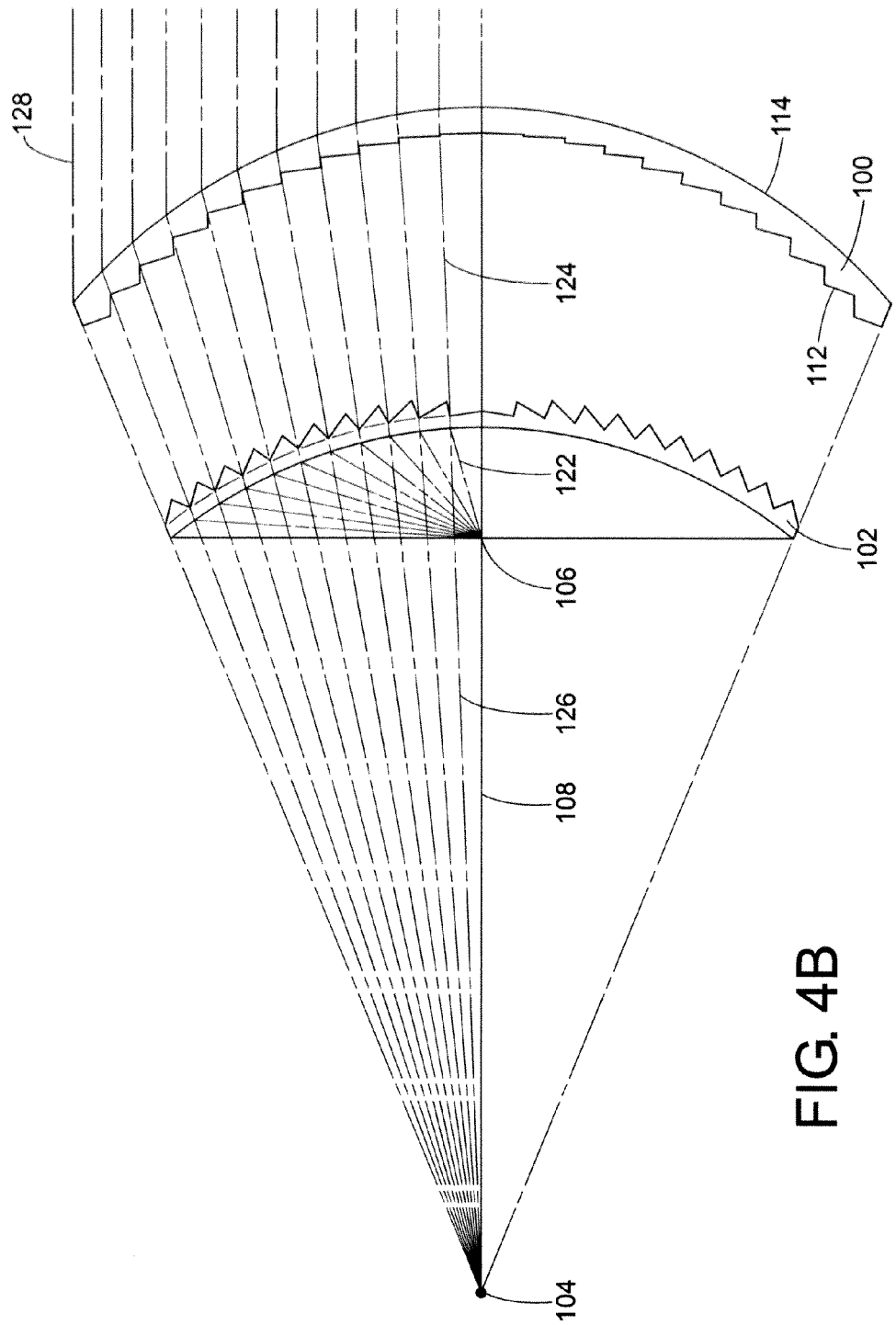
FIG. 4B is an alternative schematic view of two optical elements cooperating with a light source for use in an embodiment of a novel signal lamp.

FIG. 4B is similar to FIG. 4A and shows that the outer refractive optical element 100 and the inner optical element 102 can collectively function as a pair of converging lenses. More particularly, the inner optical element 102 collects most of the light from the point light source 104 and simulates a focal point to the outer refractive optical element 100. The outer refractive optical element 100 generally comprises a complex pin optic that distributes the light from a point source to a given specification, wherein each and every pin has a unique shape. FIG. 4B includes a number of additional lines 128 showing the light being collimated while exiting the outer refractive optical element 100. Accordingly, the beam pattern gets narrower after each lens, even while the "shell" (i.e., the outer refractive optical element 100) is distributing the light for a given specification.

Figure 7:
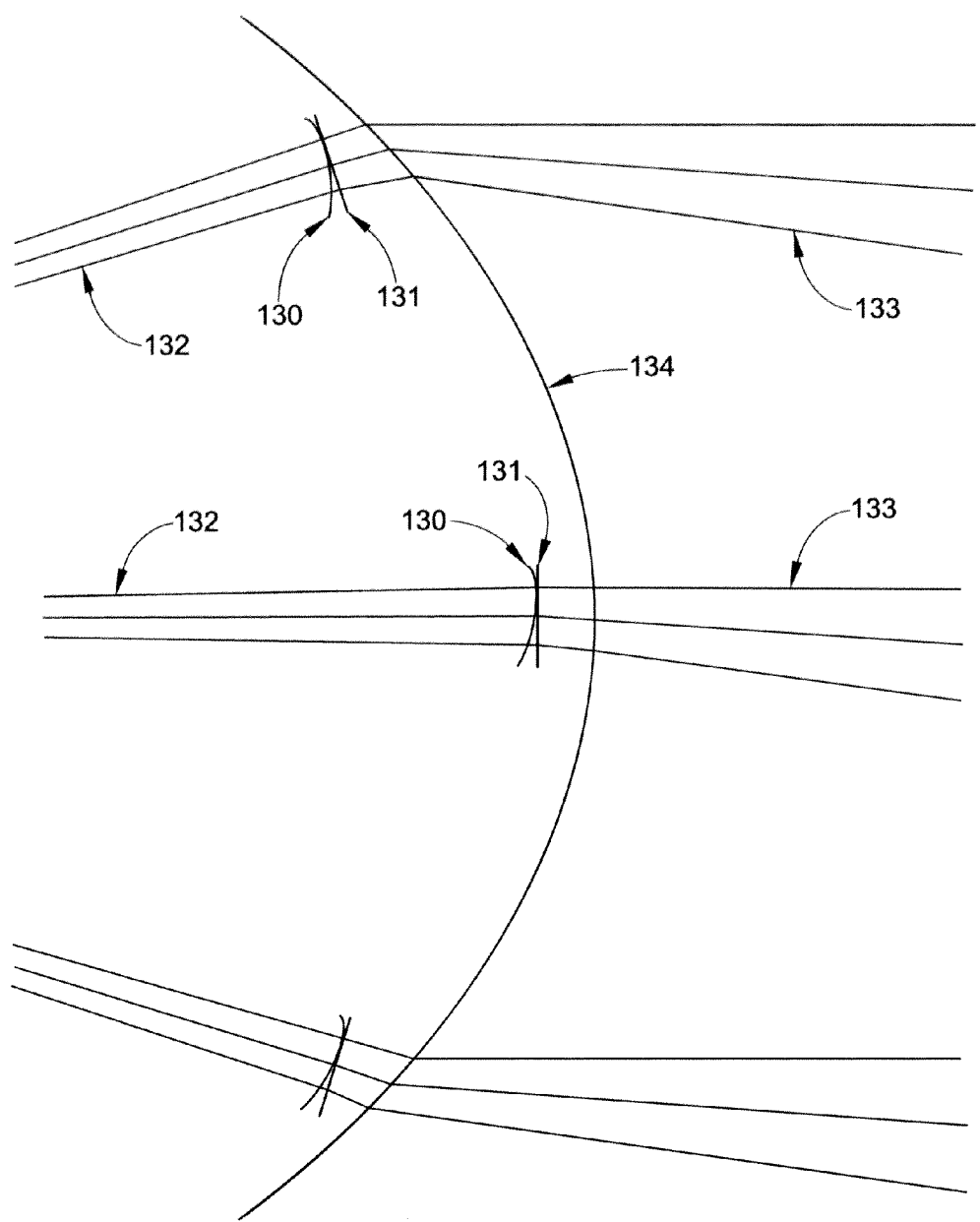
FIG. 7 is a schematic, vertical sectional view of the distribution curve reference to the inner reference plane.
Figure 8:
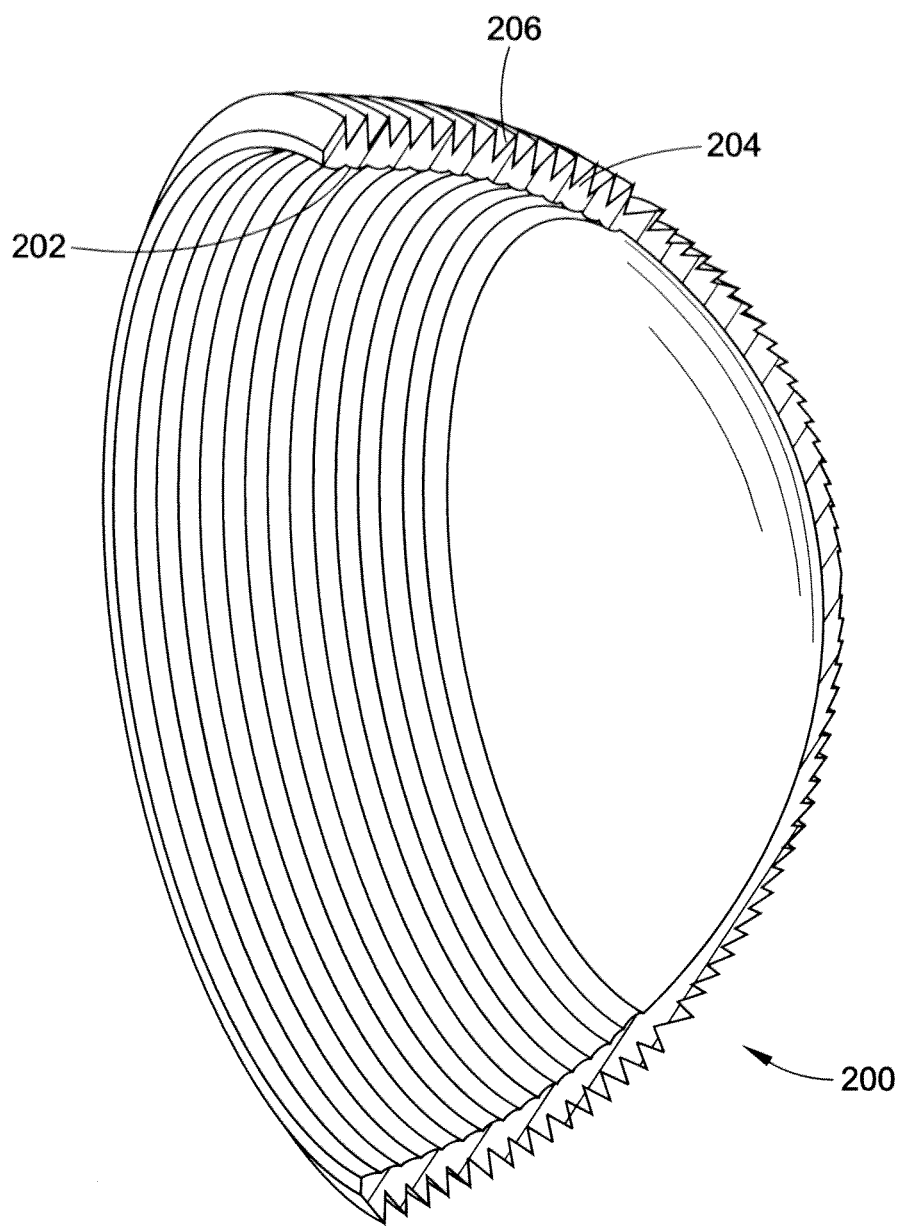
FIG. 8 is a partial side view of an exemplary lens in accordance with aspects of the present disclosure.

FIG. 7 demonstrates control of the light to generate an asymmetric beam pattern. Outer surface 134 represents an outer surface of an optical element that is similar to outer surface 114 described with reference to FIG. 4. Reference surface 131 is similar to inner surface 112 described with reference to FIG. 4 and inner surface 64 described with reference to FIG. 3. Incoming light rays 132 are similar to light rays 124 described with reference to FIG. 4. To create an asymmetric beam pattern, the inner surface 131 is replaced by the distribution surface 130. The distribution surfaces 130 are oriented at the same angle as the reference inner surfaces which results in the outer surface 134 transmitting the same beam pattern against the central axis 108. The inner distribution surface 130 of the lens, which is an optical element including the outer surface 134 and the inner distribution surface 130, can be disposed in a pattern, e.g. a radial or linear (square or diamond) pattern. In certain instances it has been found desirable to move the beam axis 5° down the horizontal axis to provide the desired intensity for a signal lamp. In yet another embodiment, a total internal reflection element 200 for an LED signal is shown in FIG. 8. Total internal reflection (TIR) is a phenomena where electromagnetic radiation (light) in a given medium (e.g., an acrylic or polycarbonite material) incident on the boundary with a less dense medium (e.g., air), at an angle equal to or larger than the critical angle, is completely reflected from the boundary. Commonly used in fiber optics technology and in binocular prisms, properly designed optical components using total internal reflection do not require expensive mirror/reflective coated surfaces to re-direct light. To achieve a materials savings in a TIR element, rather than a single large reflective face, a series of smaller consecutive TIR faces may be utilized. As the interface between the consecutive TIR faces creates an undesired light refraction, it is desirable that the interface between faces be as small (or sharp), as possible.

As shown in FIG. 8, a plurality of curved entry faces 202 is aligned with a corresponding plurality of TIR faces 204 and exit faces 206, which redirect light emitted from the base of the signal in a generally downward direction. The curved entry faces 202 have the optical effect of concentrating incident light onto a center of the corresponding TIR face 204, thereby allowing light to impinge on the TIR faces 204 from a wider range of angles to be redirected for downward projection through the desired exit faces 206. The TIR element 200 may be constructed with a stepped configuration on the exit faces 206 to minimize the space and materials required for the element 200, among other things.

Each of the curved entry faces 202 is sloped in the direction of the next stepped level, which lowers light loss creating zones by decreasing the optical area dedicated to the radiuses between stepped levels of the entry faces 202. The signal may be configured for retrofitting into existing incandescent signal housings.

Figure 9:
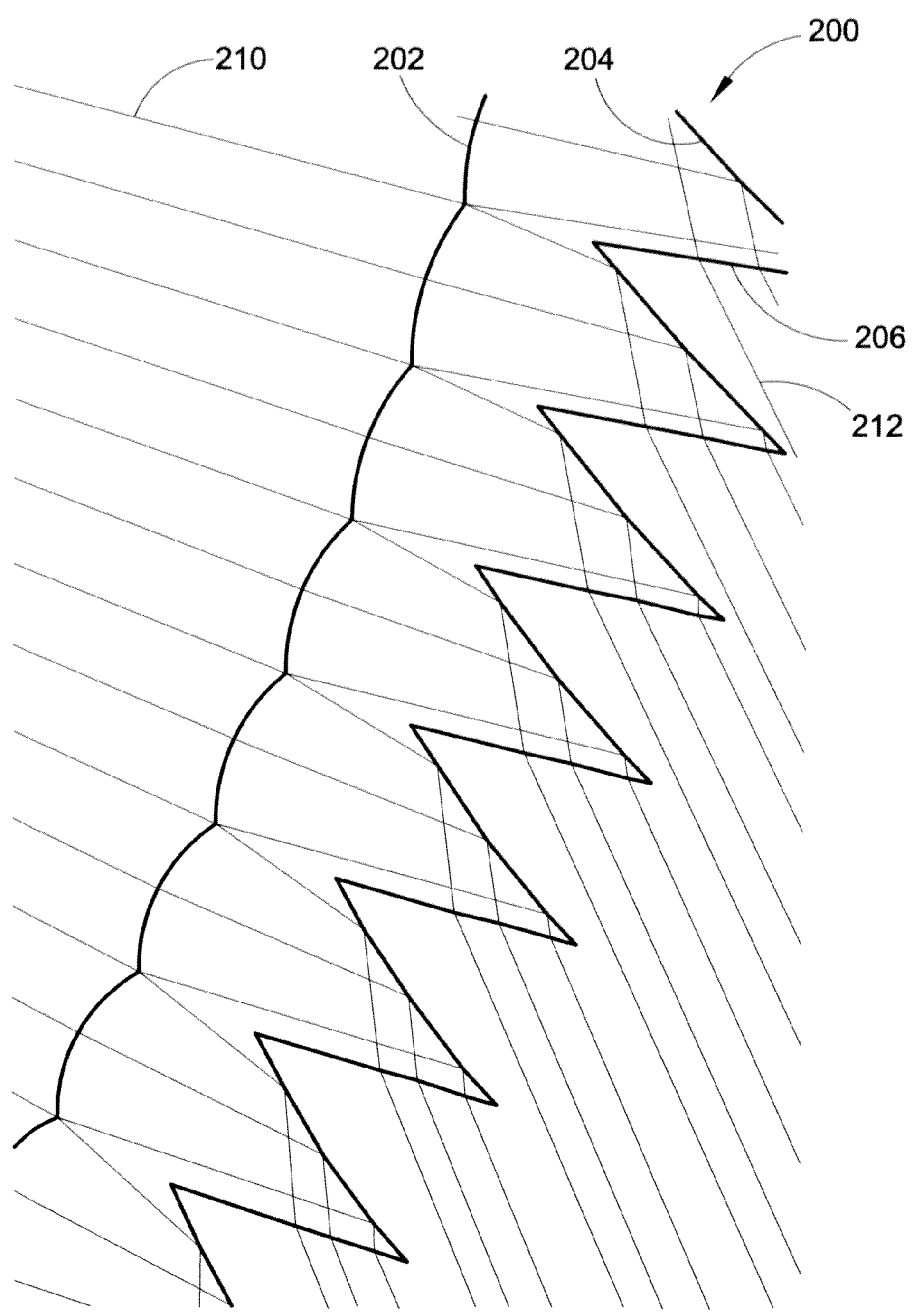
FIG. 9 is a sectional view ray diagram of a TIR element showing a curved entry face embodiment.

FIG. 9 is a close-up view of a portion of the TIR element 200 of FIG. 8. The light rays 210 incident upon the entry faces 202 are preferably parallel aligned with the lens axis whereby generally all of the light incident upon the entry face 202 converges and impacts the corresponding TIR face 204. The light rays 212 exiting the exit faces 206 are thereby directed in a downward manner.

Figure 10:
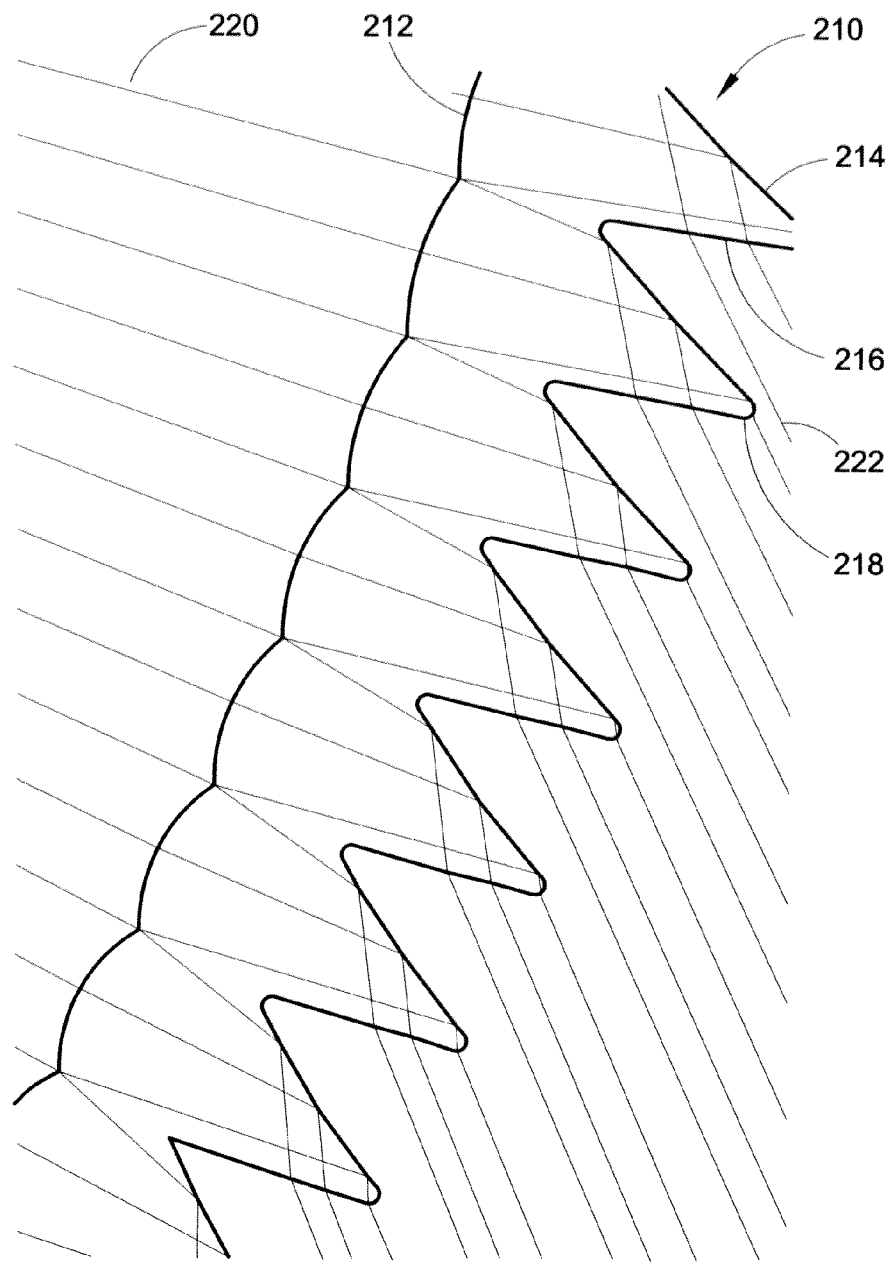
FIG. 10 is a sectional view ray diagram of a TIR element having a mold machining radius.

FIG. 10 shows an alternative TIR element 210, which also has a plurality of curved entry faces 212 that are aligned with a corresponding plurality of TIR faces 214 and exit faces 216, which redirect light emitted from the base of the signal in a generally downward direction. The curved entry faces 212 have the optical effect of concentrating incident light onto a center of the corresponding TIR face 214, thereby allowing light to impinge on the TIR faces 214 from a wider range of angles to be redirected for downward projection through the desired exit faces 216. The TIR element 210 may be constructed with a stepped configuration on the exit faces 216. Each of the curved entry faces 212 is sloped in the direction of the next stepped level, which lowers light loss creating zones by decreasing the optical area dedicated to the radiuses between stepped levels of the entry faces 212. In this embodiment, radiuses 218 are added at transition points between the steps of the TIR faces 214 and the exit faces 216. It is to be understood that there is generally a radius on the edge of the stepped optical element due to the machining tool geometry or wearing of the mold. Machining the sharpest edge on a mold may reduce the uncontrolled light generated by the radius, but it may also generate performance variation over time due to wearing of the mold. A sharp edge also increases the fragility of the part at impact and vibration.

As shown in FIG. 10, the light rays 220 incident upon the entry faces 212 are preferably parallel aligned with the lens axis whereby generally all of the light incident upon the entry face 212 converges and impacts the corresponding TIR face 214. The light rays 222 exiting the exit faces 216 are thereby directed in a downward manner.

Figure 11:
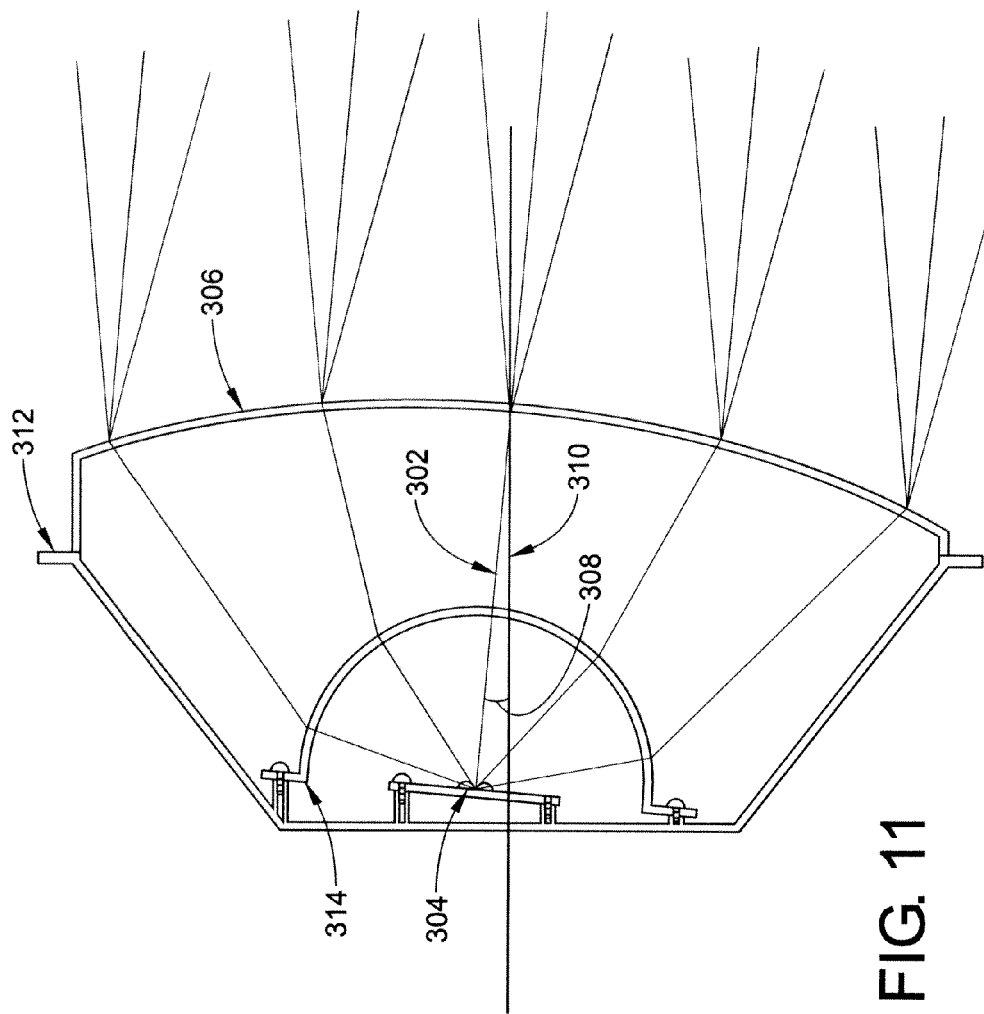
FIG. 11 is a schematic, sectional view of a signal lamp in accordance with aspects of the present disclosure.

With reference now to FIG. 11, in an alternative embodiment of the signal lamp, an optical axis 302 is an imaginary line between the center of an LED array 304 to the center of an outer lens (or shell) 306. Note there is an angle 308 between the optical axis 302 and a geometrical axis 310. The angle 308 between the geometrical axis 310 and the optical axis 302 depends on the center of light flux as determined by the specification. For example, in the case of the ITE (Institute of Transportation Engineers) specification, the center of flux is around 5 degrees down the horizon. So the optical axis 302 would be approximately 5 degrees lower than the geometrical axis 310 pointing to the horizon. The geometrical axis 310 is an imaginary line crossing perpendicular to the center of an installation rim (or housing) 312. FIG. 11 also shows an optional inner lens 314 that is symmetrical with respect to the optical axis 302, but it can be asymmetrical as well. It is to be appreciated that the features shown in FIG. 11 may be applied to the previously described embodiments of the signal lamp.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A lighting device comprising:
   a housing having an open end;
   a refractive optical element closing the open end of the housing, the optical element comprising a converging outer surface and a diverging inner surface; and
   a light source cooperating with the optical element, wherein the light source is disposed proximate the focal point of the refractive optical element.

2. The lighting device according to claim 1, wherein the optical element comprises an inner surface having a reference plane normal to the trajectory of the incoming light rays.

3. The lighting device according to claim 2, wherein the optical element comprises a collimating lens, the inner surface being configured to be planar and normal to light rays emanating from the light source and the outer surface being configured to redirect light rays to provide a generally collimated light beam pattern.

4. The lighting device according to claim 1, further comprising a support carrying at least one LED.

5. The lighting device according to claim 3, wherein the housing has a geometrical axis and the support is spaced toward the open end from the focal point.

6. A lighting device comprising:
   a housing having an open end and a geometrical axis;
   at least one light source disposed along an optical axis;
   an outer optical element having a focal point and closing the open end of the housing, the optical element comprising a converging outer surface and a diverging inner surface that cooperates with the light coming from the inner optical element; and
   an inner optical element between the light source and the outer optical element, the inner optical element redirecting light from a light source that is offset from the focal point toward the outer optical element.

7. The lighting device according to claim 6, wherein the outer and inner optical elements are rotationally symmetrical about the geometrical axis.

8. The lighting device according to claim 6, wherein the inner surface of the outer optical element is facetted and the outer surface of the outer optical element is smooth.

9. The lighting device according to claim 6, wherein the light source includes a first and second light source, the first light source being disposed closer to the inner optical element than the second light source.

10. The lighting device according to claim 6, wherein the outer optical element is configured to cooperate with a second light source to provide a generally collimated light beam pattern.

11. The lighting device according to claim 6, further comprising a support for a plurality of LEDs.

12. A lighting device comprising:
    a housing having an open end; and
    at least two converging lenses, wherein one converging lens is positioned to collect most of the light from a light source and another converging lens is positioned to close the open end of the signal lamp and distribute the light for a given specification.

13. The lighting device according to claim 12, further comprising at least one light source disposed along an optical axis and wherein the housing has a geometrical axis.

14. The lighting device according to claim 12, further comprising a support for a plurality of LEDs.

15. A lighting device comprising:
    a housing having an open end;
    a light source; and
    a converging lens comprising a curved entry face, a total internal reflection face and an exit face, wherein the curved entry face is configured to converge the light from the light source toward the center of the total internal reflection face.

16. The lighting device according to claim 15, further comprising a support for a plurality of LEDs.

17. The lighting device according to claim 15, wherein the light source is disposed along an optical axis and wherein the housing has a geometrical axis.

* * * * *